(12) United States Patent
Mongillo et al.

(10) Patent No.: US 10,280,762 B2
(45) Date of Patent: May 7, 2019

(54) MULTI-CHAMBER PLATFORM COOLING STRUCTURES

(71) Applicant: United Technologies Corporation, Hartford, CT (US)

(72) Inventors: Dominic J Mongillo, West Hartford, CT (US); Brandon W Spangler, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 507 days.

(21) Appl. No.: 14/961,112

(22) Filed: Dec. 7, 2015

(65) Prior Publication Data

US 2017/0145832 A1 May 25, 2017

Related U.S. Application Data

(63) Continuation-in-part of application No. 14/946,279, filed on Nov. 19, 2015.

(51) Int. Cl.
*F01D 5/18* (2006.01)
*B23P 15/04* (2006.01)
*F02C 7/18* (2006.01)

(52) U.S. Cl.
CPC .............. *F01D 5/186* (2013.01); *B23P 15/04* (2013.01); *F01D 5/187* (2013.01); *F02C 7/18* (2013.01);

(Continued)

(58) Field of Classification Search
CPC ..... F02C 7/18; F01D 5/18; F01D 5/08; F01D 5/186; F01D 5/187; F01D 5/085;
(Continued)

(56) References Cited

U.S. PATENT DOCUMENTS

| 5,344,283 | A | * | 9/1994 | Magowan | ............... F01D 5/187 |
| | | | | | 415/115 |
| 6,017,189 | A | * | 1/2000 | Judet | ...................... F01D 5/081 |
| | | | | | 416/193 A |

(Continued)

FOREIGN PATENT DOCUMENTS

EP          1826360         8/2007

OTHER PUBLICATIONS

Extended European Search Report dated Mar. 20, 2017 in European Application No. 16198946.2.

*Primary Examiner* — Carlos A Rivera
*Assistant Examiner* — Adam W Brown
(74) *Attorney, Agent, or Firm* — Snell & Wilmer L.L.P.

(57) ABSTRACT

A platform is disclosed. The platform may include an airfoil section with a cooling cavity and a platform. The platform may have various cooling features, such as a platform cooling apparatus. The platform cooling apparatus may have a cooling chamber forming a channel disposed at least partially through the platform and the platform cooling apparatus may have an inflow channel in fluidic communication with the chamber and the cooling cavity so that cooling air may travel from the cooling cavity of the blade airfoil section and into the platform cooling apparatus. Moreover, the platform cooling apparatus may have a cooling cover apparatus at least partially fluidically sealing the platform cooling apparatus.

16 Claims, 10 Drawing Sheets

(52) U.S. Cl.
CPC .... *F05D 2230/232* (2013.01); *F05D 2240/81* (2013.01); *F05D 2260/202* (2013.01); *F05D 2260/204* (2013.01); *F05D 2260/205* (2013.01); *F05D 2260/22141* (2013.01)

(58) Field of Classification Search
CPC ..... F05D 2260/205; F05D 2260/22141; F05D 2260/204; F05D 2260/202; F05D 2240/81; F05D 2230/232
See application file for complete search history.

(56) References Cited

U.S. PATENT DOCUMENTS

| | | | | |
|---|---|---|---|---|
| 6,120,249 A * | 9/2000 | Hultgren | ................. | F01D 5/187 416/193 A |
| 6,644,920 B2 * | 11/2003 | Beeck | ................. | B23H 9/10 204/212 |
| 7,131,817 B2 * | 11/2006 | Keith | ................. | F01D 5/081 416/97 R |
| 7,416,391 B2 * | 8/2008 | Veltre | ................. | F01D 5/187 416/193 A |
| 7,927,073 B2 * | 4/2011 | Scott | ................. | F01D 5/187 416/193 A |
| 8,096,767 B1 * | 1/2012 | Liang | ................. | F01D 5/187 415/115 |
| 8,356,978 B2 * | 1/2013 | Beattie | ................. | F01D 5/18 415/115 |
| 8,444,381 B2 * | 5/2013 | Seely | ................. | F01D 5/082 415/1 |
| 8,794,921 B2 * | 8/2014 | Ellis | ................. | F01D 5/087 29/525 |
| 2006/0269409 A1 * | 11/2006 | Torii | ................. | F01D 5/187 416/97 R |
| 2015/0110641 A1 * | 4/2015 | Herzlinger | ................. | F01D 5/186 416/97 R |
| 2015/0369079 A1 * | 12/2015 | McCaffrey | ................. | F01D 17/16 415/148 |

* cited by examiner

MULTI-CHAMBER PLATFORM COOLING STRUCTURES

CROSS-REFERENCE TO RELATED APPLICATIONS

This application is a continuation-in-part of and claims priority to U.S. Ser. No. 14/946,279 filed on Nov. 19, 2015 and entitled "SERPENTINE PLATFORM COOLING STRUCTURES."

FIELD

The present disclosure relates generally to cooling structures for gas turbine engines, and more specifically, to a multi-chamber platform cooling structure.

BACKGROUND

In a gas turbine engine, airfoil platforms are frequently cooled to ameliorate thermal mechanical fatigue that may occur. For example, thermal fight between a relatively hotter and thinner airfoil platform and a relatively cooler and thicker airfoil may cause early wear and/or failure.

SUMMARY

A platform is disclosed. The platform may include a platform cooling apparatus including a first cooling chamber and a second cooling chamber separated by a first dividing rib, and disposed at least partially through the platform, and configured to conduct cooling air. It should be understood that more than two platform cooling chambers may be incorporated to further optimize the platform feed source pressures and better optimize the cooling flow distribution, convective heat transfer, and cooling air heat pickup within subsequent platform chambers. The platform cooling apparatus further includes a first outflow aperture including an orifice extending in fluidic communication between the first cooling chamber of the platform cooling apparatus and through at least a portion of the platform and in fluidic communication with a surrounding engine operating environment immediately proximate to an external surface of the platform, and a cooling cover apparatus at least partially fluidically sealing the platform cooling apparatus.

The platform cooling apparatus may further include a first inflow channel in fluidic communication with the first cooling chamber wherein the first inflow channel is configured to conduct the cooling air to the first cooling chamber.

The platform cooling apparatus may further include heat transfer enhancement features disposed within the first cooling chamber.

The heat transfer enhancement features may include at least one of trip strips (of various orientations), pedestals (of various diameter and spacing), and/or pin fins (of spherical, conical, triangular, elliptical shapes)

The platform cooling apparatus may further include a second inflow channel in fluidic communication with a second cooling chamber, wherein the second inflow channel is configured to conduct the cooling air to the second cooling chamber.

In various embodiments, the platform cooling apparatus further includes a second outflow aperture including a second orifice extending in fluidic communication between the second cooling chamber of the platform cooling apparatus and through at least a portion of the platform and in fluidic communication with the surrounding ambient environment immediately proximate to an external surface of the platform.

In various embodiments, the first inflow channel is in fluidic communication with a first cooling cavity of an airfoil section and the second inflow channel is in fluidic communication with a second cooling cavity of an airfoil section.

In various embodiments, the first inflow channel is in fluidic communication with a first cooling cavity of an airfoil section and the second inflow channel is in fluidic communication with the first cooling cavity of the airfoil section.

In various embodiments, the inflow channel supplying cooling air to the cooling cavities may be of non-cylindrical shape, and may include but not limited to elliptical, conical, teardrop geometries, The supply feed geometry may not be of constant flow area, and may be converging and diffusing flow area depending upon inlet pressure loss and downstream convective and/or film cooling objectives. Additionally the supply feed geometry may also be linear, curved, and/or curved-linear in geometry shape to better manage fluidic pressure losses and mitigate local flow separation feeding the downstream platform cooling chambers.

In various embodiments, the platform further includes a defined gap, including an opening between the cooling cover apparatus and the platform whereby the cooling air may escape from the first cooling chamber. Additionally, alternate purge flow exit geometries may be incorporated, of unlimited size and shape either independently and/or in conjunction with a defined gap. Moreover, a retention mechanism may retain the cooling cover apparatus in mechanical communication with the platform proximate to the platform cooling apparatus. The retention mechanism may include an integral formation including an integral joining of the cover plate to the platform.

The cooling cover apparatus may include a cover plate including a plate structure disposed radially inward of the platform cooling apparatus and configured to at least partially fluidically seal the platform cooling apparatus.

The retention mechanism may include a weld. The weld may include a perimeter weld including welding extending around all edges of the cover plate. The weld may include a platform edge weld including welding extending along a single edge of the cover plate. The weld may include a rib weld extending along the first dividing rib of the platform cooling apparatus and joining the first dividing rib to the cover plate.

In alternative casting and core manufacturing approaches, the platform cooling chambers may be integrally cast-in with the supply feed holes. In this instance the platform cooling chambers are entirely encapsulated by base alloy material to improve overall platform strength characteristics.

A rotor blade is disclosed. The rotor blade may include a blade airfoil section including a cooling cavity, and a platform. The platform may include a platform cooling apparatus including a first cooling chamber and a second cooling chamber separated by a first dividing rib, and disposed at least partially through the platform, and configured to conduct cooling air. The platform cooling apparatus further includes a first outflow aperture including an orifice extending in fluidic communication between the first cooling chamber of the platform cooling apparatus and through at least a portion of the platform and in fluidic communication with a surrounding engine operating environment immediately proximate to a surface of a rotor blade, and a cooling cover apparatus at least partially fluidically sealing the platform cooling apparatus.

The platform may further include heat transfer enhancement features disposed within the first cooling chamber. The platform cooling apparatus may further include N-number of additional outflow apertures including N-number of orifices extending in fluidic communication between the second cooling chamber of the platform cooling apparatus and through at least a portion of the platform and in fluidic communication with the surrounding ambient environment immediately proximate to the surface of the rotor blade.

A method of forming a platform is disclosed. The method may include forming a platform cooling apparatus including a first cooling chamber and a second cooling chamber separated by a first dividing rib, and disposed at least partially through the platform, and configured to conduct cooling air. The platform cooling apparatus may further include a first outflow aperture including an orifice extending in fluidic communication between the first cooling chamber of the platform cooling apparatus and through at least a portion of the platform and in fluidic communication with a surrounding engine operating environment immediately proximate to an external surface of the platform. The method may include forming a cooling cover apparatus at least partially fluidically sealing the platform cooling apparatus.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this invention and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

As used herein, including throughout the Figures, "pressure side" (PS) of an airfoil means the side of the airfoil having a shorter length and/or proximate to slower moving fluid and/or fluid at higher surface static pressure as compared to the "suction side" (SS) of the airfoil. "Suction side" of an airfoil means the side of the airfoil having a longer length and/or proximate to faster moving fluid and/or fluid at a lower surface static pressure as compared to the "pressure side" of the airfoil. Pointing or oriented "outward" means having a vector component extending at least partially outward, such as oriented to direct cooling air at least partially outward. Pointing "inward" means having a vector component extending at least partially inward, such as oriented to direct cooling air at least partially inward. Similarly, as used herein a "first direction" and a "second direction" comprise directions having a vector component extending at least partially in opposite directions, such as wherein the statement pointing in a "first direction" means having a vector component extending at least partially opposite the "second direction."

Figure 1:
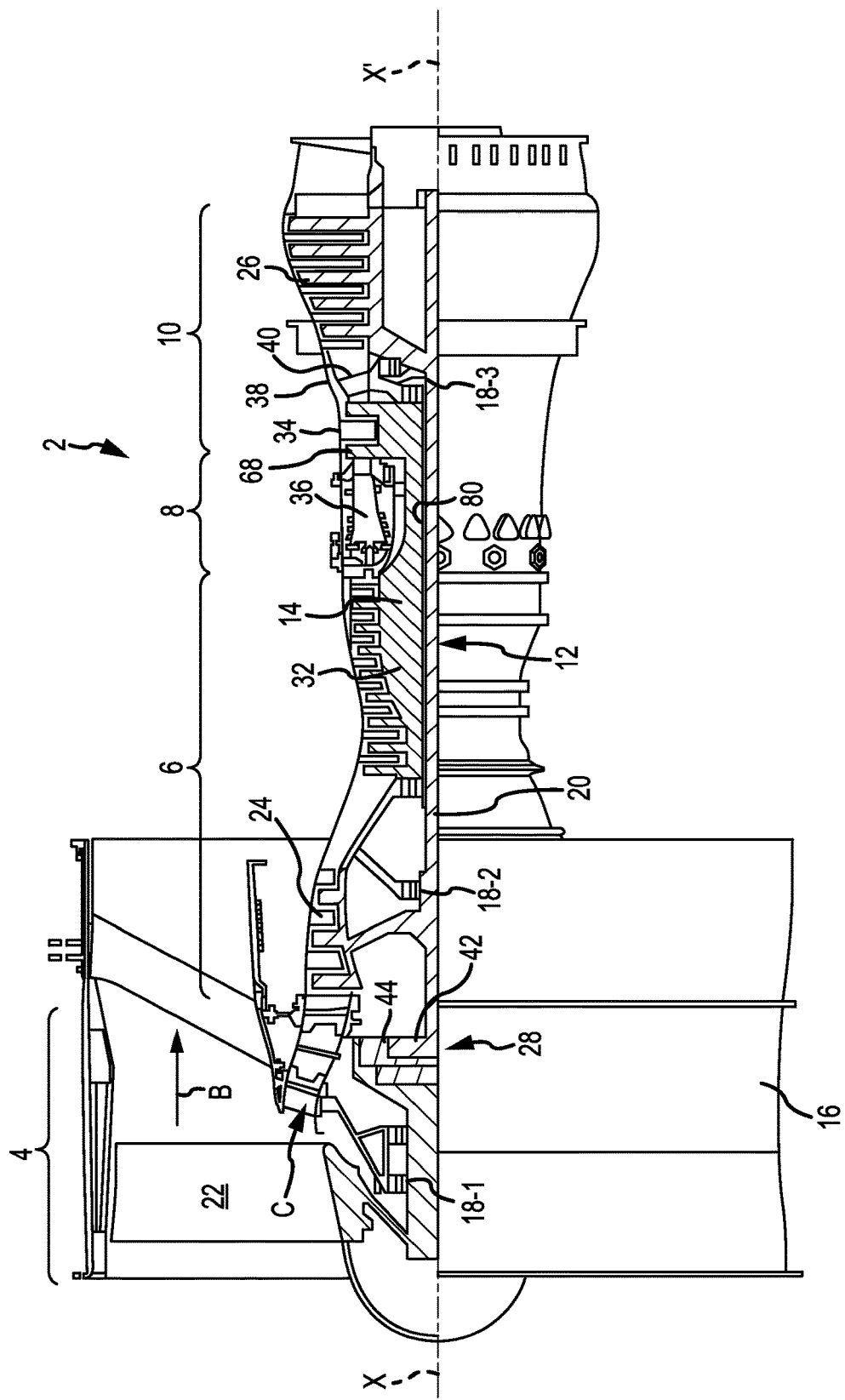
FIG. 1 illustrates a cross-sectional view of an exemplary gas turbine engine, according to various embodiments.
Figure 2A:
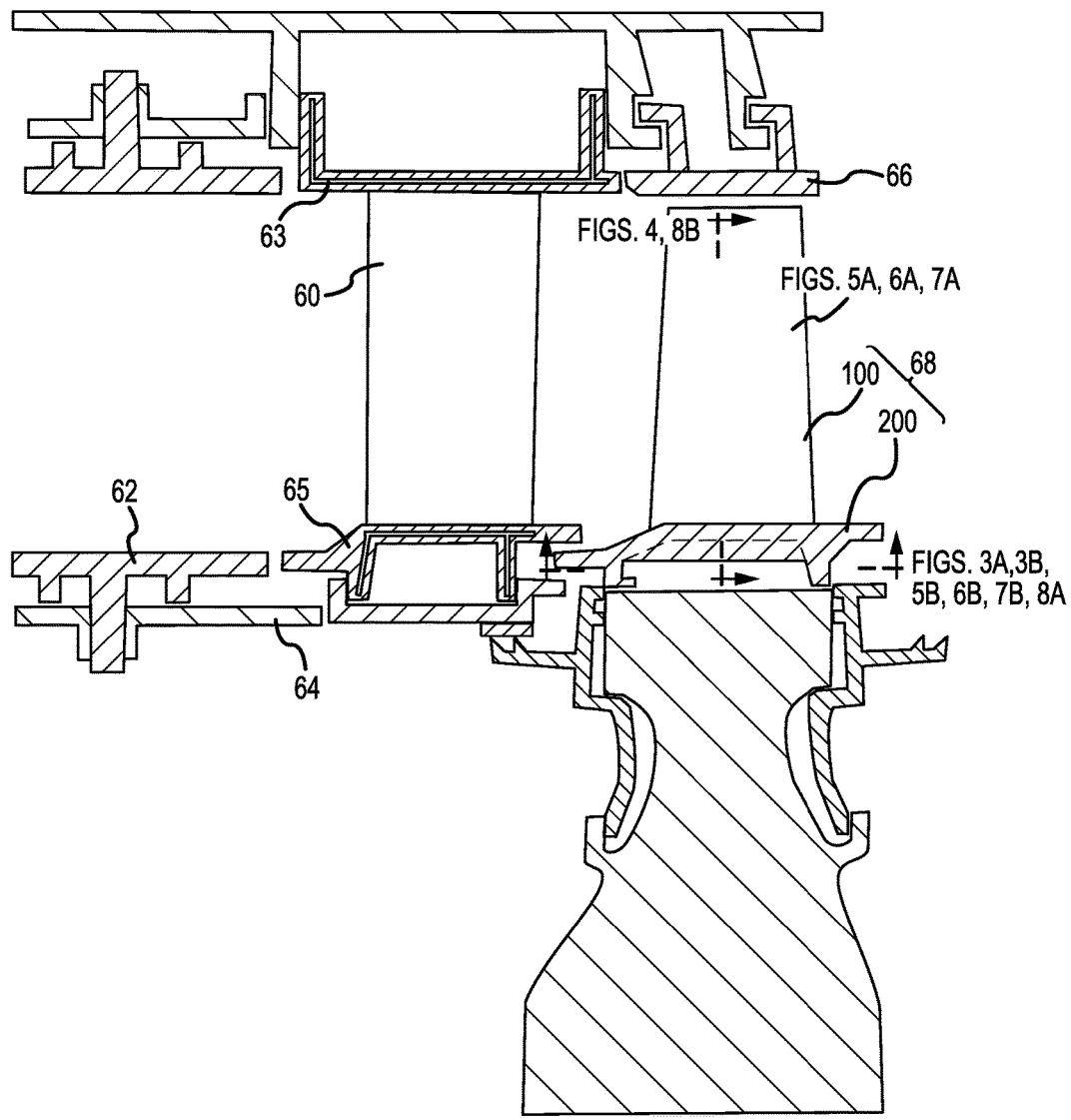
FIG. 2A illustrates example airfoils, such as a rotor blade and a stator vane of an exemplary gas turbine engine, according to various embodiments.

With reference to FIGS. 1 and 2A, an exemplary gas turbine engine 2 is provided. Gas turbine engine 2 is a two-spool turbofan that generally incorporates a fan section 4, a compressor section 6, a combustor section 8 and a turbine section 10. Alternative engines include, for example, an augmentor section among other systems or features. In operation, fan section 4 drives air along a bypass flow-path B while compressor section 6 drives air along a core flow-path C for compression and communication into combustor section 8 then expansion through turbine section 10. Although depicted as a turbofan gas turbine engine 2 herein, it should be understood that the concepts described herein are not limited to use with turbofans as the teachings is applicable to other types of turbine engines including three-spool architectures. A gas turbine engine may comprise an industrial gas turbine (IGT) or a geared aircraft engine, such as a geared turbofan, or non-geared aircraft engine, such as a turbofan, or may comprise any gas turbine engine as desired.

Gas turbine engine 2 generally comprises a low speed spool 12 and a high speed spool 14 mounted for rotation about an engine central longitudinal axis X-X' relative to an engine static structure 16 via several bearing systems 18-1, 18-2, and 18-3. It should be understood that bearing systems is alternatively or additionally provided at locations, including for example, bearing system 18-1, bearing system 18-2, and bearing system 18-3.

Low speed spool 12 generally comprises an inner shaft 20 that interconnects a fan 22, a low pressure compressor section 24, e.g., a first compressor section, and a low pressure turbine section 26, e.g., a second turbine section. Inner shaft 20 is connected to fan 22 through a geared architecture 28 that drives the fan 22 at a lower speed than low speed spool 12. Geared architecture 28 comprises a gear assembly 42 enclosed within a gear housing 44. Gear assembly 42 couples the inner shaft 20 to a rotating fan structure. High speed spool 14 comprises an outer shaft 80 that interconnects a high pressure compressor section 32, e.g., second compressor section, and high pressure turbine section 34, e.g., first turbine section. A combustor 36 is located between high pressure compressor section 32 and high pressure turbine section 34. A mid-turbine frame 38 of engine static structure 16 is located generally between high pressure turbine section 34 and low pressure turbine section 26. Mid-turbine frame 38 supports one or more bearing systems 18, such as 18-3, in turbine section 10. Inner shaft 20 and outer shaft 80 are concentric and rotate via bearing systems 18 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by low pressure compressor section 24 then high pressure compressor section 32, mixed and burned with fuel in combustor 36, then expanded over high pressure turbine section 34 and low pressure turbine section 26. Mid-turbine frame 38 includes surface structures 40, which are in the core airflow path. Turbines 26, 34 rotationally drive the respective low speed spool 12 and high speed spool 14 in response to the expansion.

Gas turbine engine 2 is, for example, a high-bypass geared aircraft engine. The bypass ratio of gas turbine engine 2 is optionally greater than about six (6). The bypass ratio of gas turbine engine 2 is optionally greater than ten (10). Geared architecture 28 is an epicyclic gear train, such as a star gear system, e.g., sun gear in meshing engagement with a plurality of star gears supported by a carrier and in meshing engagement with a ring gear, or other gear system. Geared architecture 28 has a gear reduction ratio of greater than about 2.3 and low pressure turbine section 26 has a pressure ratio that is greater than about five (5). The bypass ratio of gas turbine engine 2 is greater than about ten (10:1). The diameter of fan 22 is significantly larger than that of the low pressure compressor section 24, and the low pressure turbine section 26 has a pressure ratio that is greater than about 5:1. Low pressure turbine section 26 pressure ratio is measured prior to inlet of low pressure turbine section 26 as related to the pressure at the outlet of low pressure turbine section 26 prior to an exhaust nozzle. It should be understood, however, that the above parameters are exemplary of a suitable geared architecture engine and that the present disclosure contemplates other turbine engines including direct drive turbofans.

The next generation of turbofan engines is designed for higher efficiency, which is associated with higher pressure ratios and higher temperatures in the high speed spool 14 and other engine sections. These higher operating temperatures and pressure ratios create operating environments that cause thermal loads that are higher than thermal loads conventionally encountered. Operating conditions in high pressure compressor section 32 are often approximately 1400° F. (approximately 760° C.) or more, and operating conditions in combustor 36 are often higher. Moreover, prior arrangements permit regions of localized temperature excursions, such as due to regions that are insufficiently cooled (such as insufficiently convectively cooled) due to the prior cooling structures. Various systems to address these challenges are presented herein.

With reference to FIGS. 1 and 2A, an engine 2 may comprise a rotor blade 68 or a stator vane 60. The engine 2 may comprise various surface structures. For instance, the stator vane 60 may have a surface structure such as an inner stator vane platform 65, or an outer stator vane platform 63. A combustor panel 62 may join a combustor liner 64 and may be a surface structure. Similarly, a blade outer air seal (BOAS) 66 may be a surface structure. Thus, a surface structure as discussed herein may comprise an inner stator vane platform 65, an outer stator vane platform 63, a combustor panel 62, a BOAS 66, and/or another structure as desired. The rotor blade 68 may comprise a blade airfoil section 100 and a platform 200, for example, a platform. Thus, a surface structure as discussed herein may also include a platform. While various aspects are described herein with reference to such features as the platform 200, and the blade airfoil section 100, such aspects may be incorporated into aspects of the stator vane, and or various structures as desired.

Figure 2B:
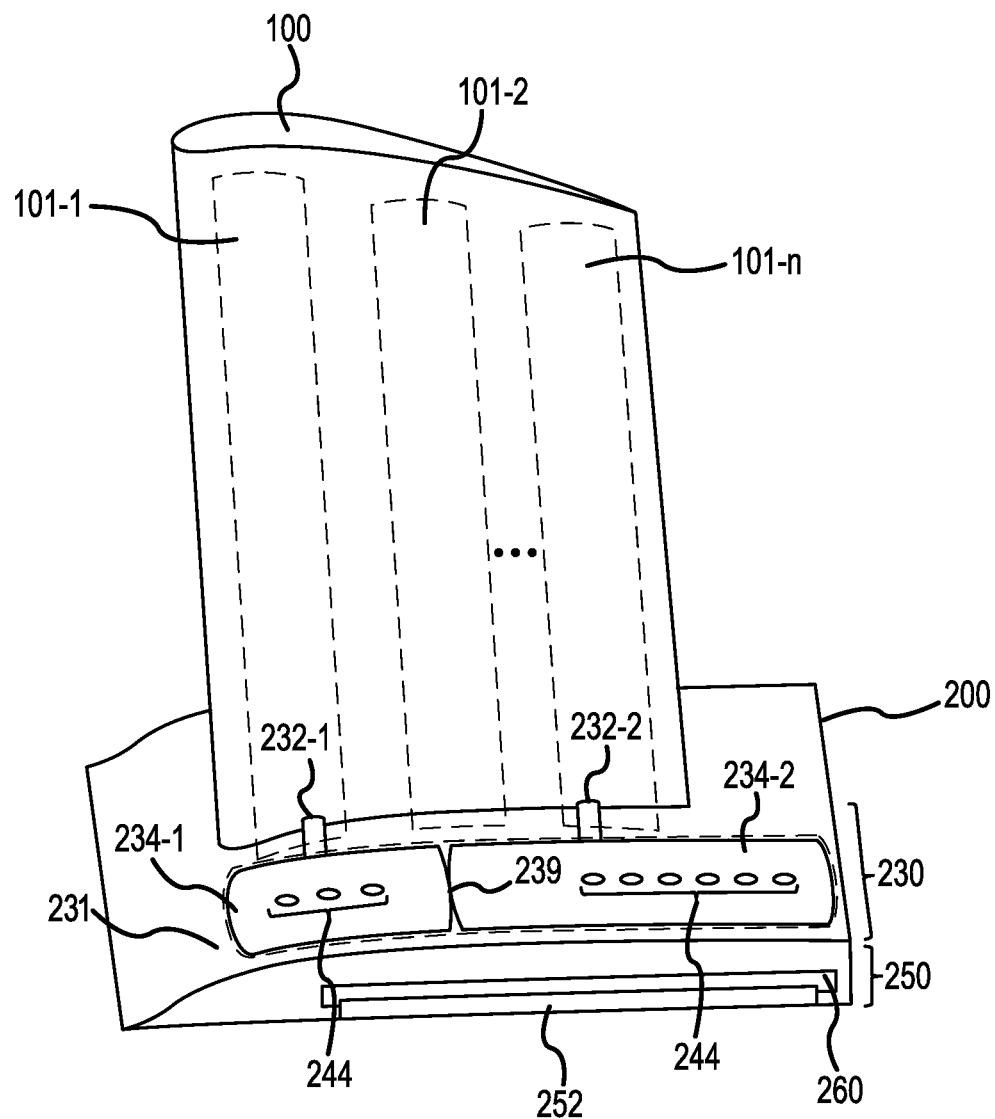
FIG. 2B illustrates an airfoil of FIG. 2A including multi-chamber platform cooling structures, according to various embodiments.

For example, with reference to FIG. 2B, a blade airfoil section 100 may comprise blade cooling cavities 101. Blade cooling cavities 101 may comprise cavities disposed internally through at least a portion of the blade airfoil section 100 and configured to receive cooling air whereby the blade airfoil section 100 is cooled. The blade cooling cavities 101 may interconnect with an inflow channel 232 of a platform cooling apparatus 230 of a platform 200 as discussed further herein.

A platform 200 may comprise a platform structure disposed inward of the rotor blade 68 (relative to the engine central longitudinal axis X-A). The platform 200 may comprise a platform cooling apparatus 230. A platform cooling apparatus 230 may comprise one or more chambers 234 disposed at least partially through the platform 200 and configured to conduct cooling air whereby the platform 200 is cooled.

The platform 200 may further comprise a cooling cover apparatus 250. The cooling cover apparatus 250 may at least partially enclose (e.g., at least partially fluidically seal) the platform cooling apparatus 230 (such as the one or more chambers 234), whereby heat transfer may be improved, and in various embodiments, further whereby structural support of the platform 200 may be provided.

With reference to FIGS. 2A-B, 3A, and 4, the platform cooling apparatus 230 may comprise one or more inflow channels 232, such as first inflow channel 232-1 through ninth inflow channel 232-9. An inflow channel 232 may comprise a channel disposed through at least a portion of at least one of the platform 200 and the blade airfoil section 100 and in fluidic communication with a blade cooling cavity 101, such as first blade cooling cavity 101-1 through fourth blade cooling cavity 101-4 of the blade airfoil section 100. The inflow channel 232 may receive cooling air from the blade cooling cavity 101 of the blade airfoil section 100 and conduct it to further aspects of the platform cooling apparatus 230, such as, for example a cooling chamber 234, for instance, a first cooling chamber 234-1 through an eighth cooling chamber 234-8. In various embodiments, the platform cooling apparatus 230 may comprise one inflow channel 232 corresponding to each cooling chamber 234. In further embodiments, the platform cooling apparatus 230 may comprise two inflow channels 232 corresponding to a cooling chamber 234. Moreover, the platform cooling apparatus 230 may comprise any number of inflow channels 232 corresponding to any number of cooling chambers 234. For example, some cooling chambers 234 may be in fluidic communication with a single inflow channel 232 each, while some cooling chambers 234 may be in fluidic communication with two or more inflow channels 232. For example, with reference to FIGS. 2B and 3A, a first blade cooling cavity 101-1 may provide cooling air to three inflow channels 232, such as an inflow channel 232-1, 232-8, 232-9, a second cooling cavity 101-2 may provide cooling air to two inflow channels 232, such as an inflow channel 232-2, 232-7, a third blade cooling cavity 101-3 may provide cooling air to two inflow channels 232, such as an inflow channel 232-3, 232-6, and a fourth blade cooling cavity 101-4 may provide cooling air to two inflow channels 232, such as an inflow channel 232-4, 232-5. Moreover, each inflow channel 232 may conduct the cooling air to a cooling chamber 234. As mentioned in various embodiments, multiple inflow channels 232 may conduct cooling air to the same cooling chamber 234. For example, with reference to FIG. 3A, a first inflow channel 232-1 may conduct cooling air to a first cooling chamber 234-1, a second inflow channel 232-2 may conduct cooling air to a second cooling chamber 234-2, a third inflow channel 232-3 may conduct cooling air to a third cooling chamber 234-3, a fourth inflow channel 232-4 may conduct cooling air to a fourth cooling chamber 234-4, a fifth inflow channel 232-5 may conduct cooling air to a fifth cooling chamber 234-5, a sixth inflow channel 232-6 may conduct cooling air to a sixth cooling chamber 234-6, a seventh inflow channel 232-7 may conduct cooling air to a seventh cooling chamber 234-7, and an eighth inflow channel 232-8 and a ninth inflow channel 232-9 may both conduct cooling air to an eighth cooling chamber 234-8. Thus, one may appreciate that any number of cooling cavities may provide cooling air to any number of inflow passages delivering the cooling air to any number of cooling chambers.

As mentioned, the platform cooling apparatus 230 may comprise a cooling chamber 234. A cooling chamber 234 may comprise one or more channels disposed at least partially through the platform 200 and configured to conduct cooling air whereby the platform 200 is cooled. The cooling chambers 234 may have a variety of arrangements, such as linear, curved, irregular, and/or the like. Moreover, and as depicted in FIG. 3A, the cooling chambers 234 may be disposed on the pressure side 198 or the suction side 199 of the rotor blade 68.

Figure 3A:
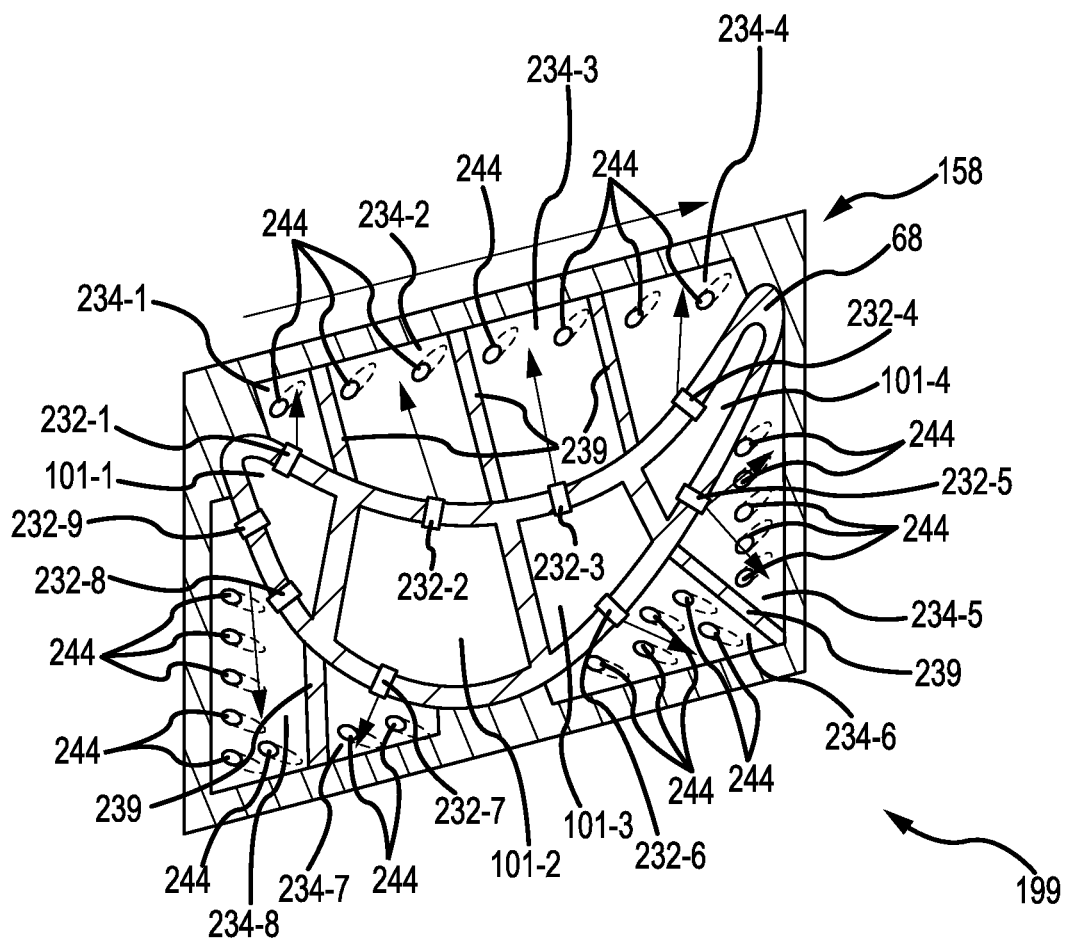
FIG. 3A illustrates an end section view of a rotor blade according to FIG. 2A, according to various embodiments.

With reference to FIGS. 2B and 3A the platform cooling apparatus 230 may comprise one or more dividing rib 239. A dividing rib 239 may comprise a sealing member disposed between two or more cooling chambers 234 and at least partially fluidically isolating the two or more cooling chambers 234 from each other. In this manner, because dividing ribs 239 isolate the cooling chambers 234 of the platform 200, the platform 200 may be said to comprise a multi-chamber platform cooling apparatus 230.

Figure 3B:
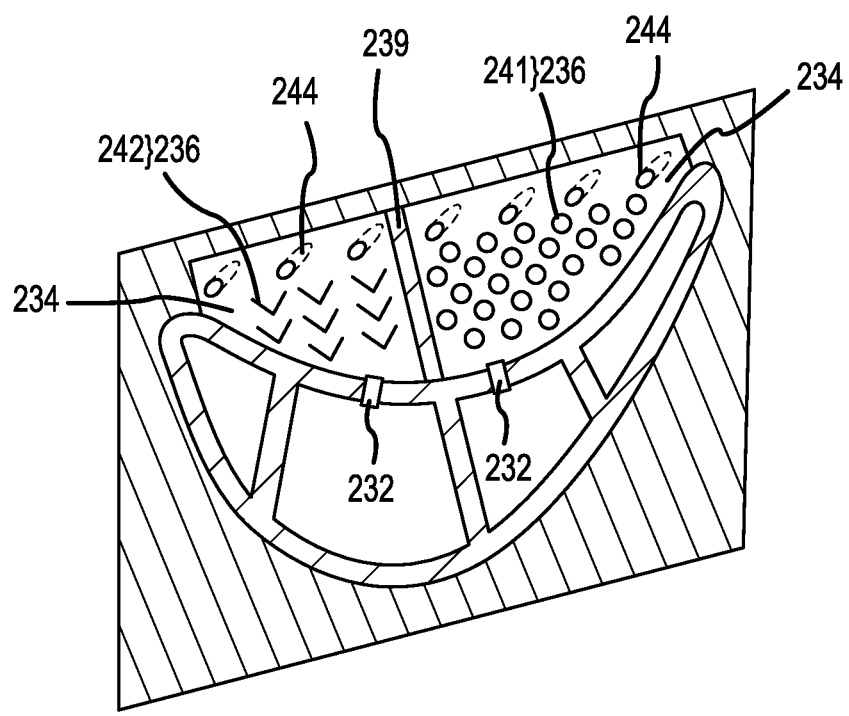
FIG. 3B illustrates an end section view of a rotor blade according to FIG. 2A further depicting heat transfer enhancement features of the rotor blade, according to various embodiments.

With momentary reference to FIG. 3B, the platform cooling apparatus 230 may further comprise heat transfer enhancement features 236. For example, heat transfer enhancement features 236 may comprise pedestals 241, and/or trip strips 242, and/or further structures within the chambers 234 of the platform cooling apparatus 230 whereby at least one of convective or conductive heat transfer among the cooling air passing through the chambers 234 and the surrounding structure of the platform 200 may be enhanced.

Figure 4:
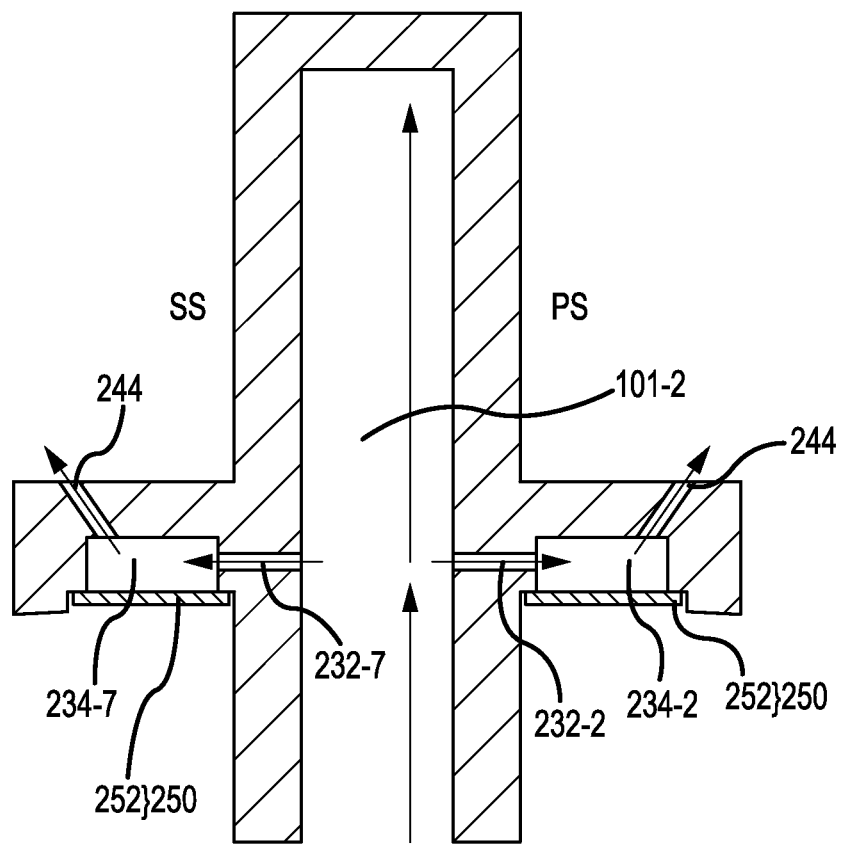
FIG. 4 illustrates a side section view of a rotor blade according to FIG. 2A, according to various embodiments.
Figure 5A:
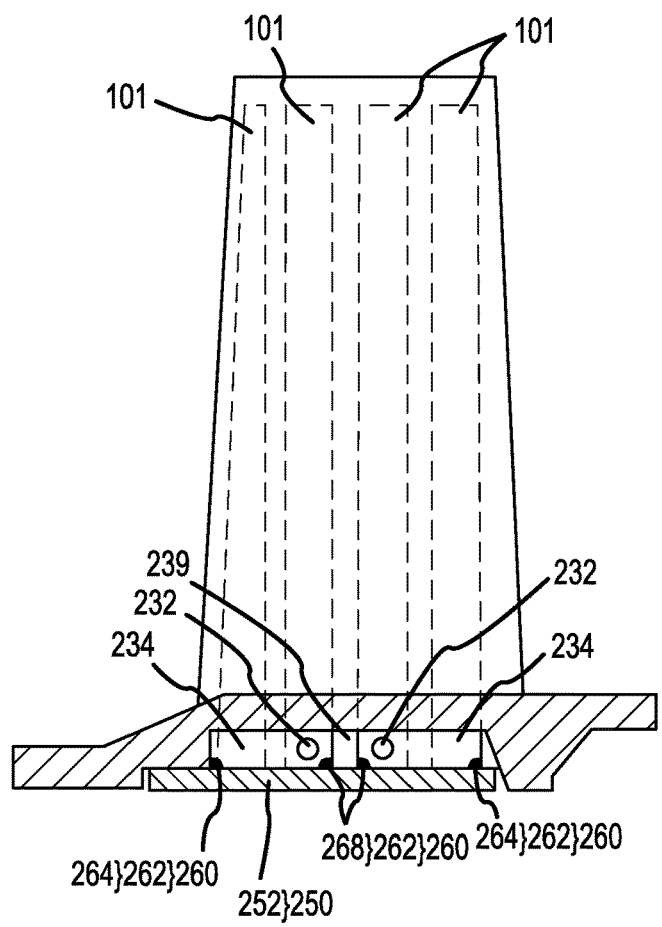
FIGS. 5A-B illustrate a side section view and end section view respectively of a rotor blade according to FIG. 2A, having a cover apparatus including a cover plate and a retention mechanism that includes a perimeter weld, according to various embodiments.
Figure 5B:
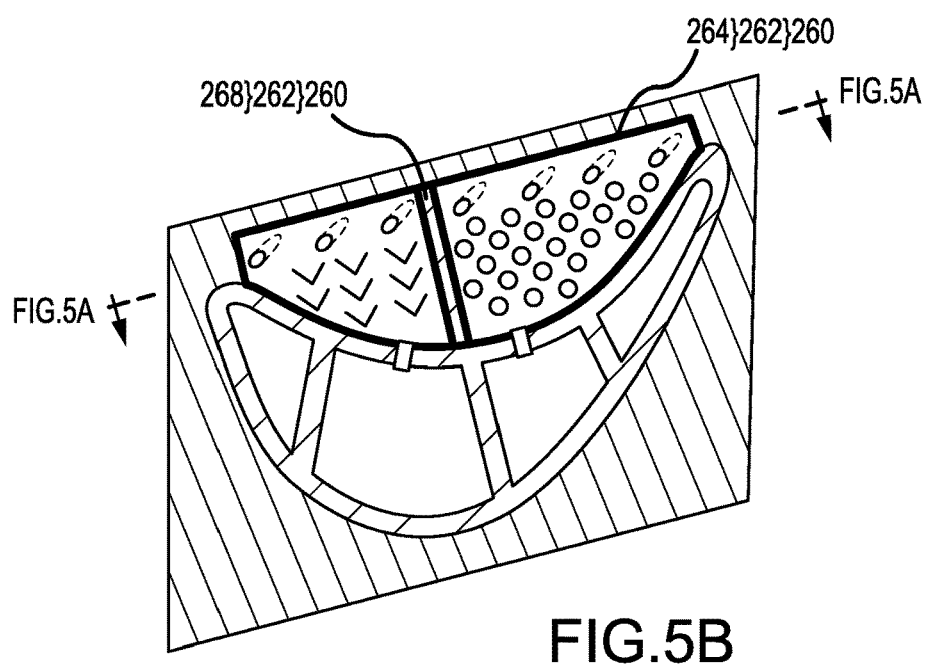
Figure 6A:
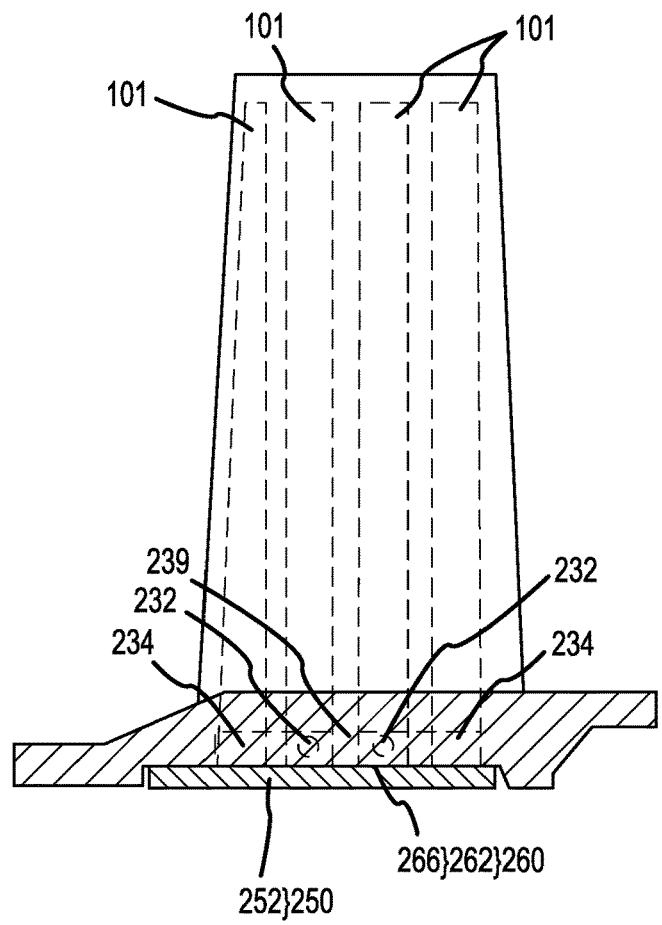
FIGS. 6A-B illustrates a side section view and end section view respectively of a rotor blade according to FIG. 2A, having a cover apparatus including a cover plate and a retention mechanism that includes a platform edge weld, according to various embodiments.
Figure 6B:
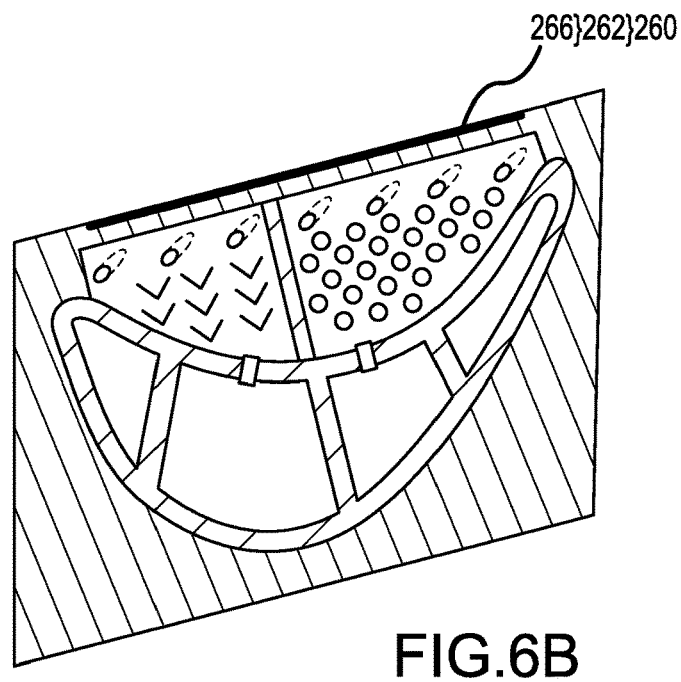
Figure 7A:
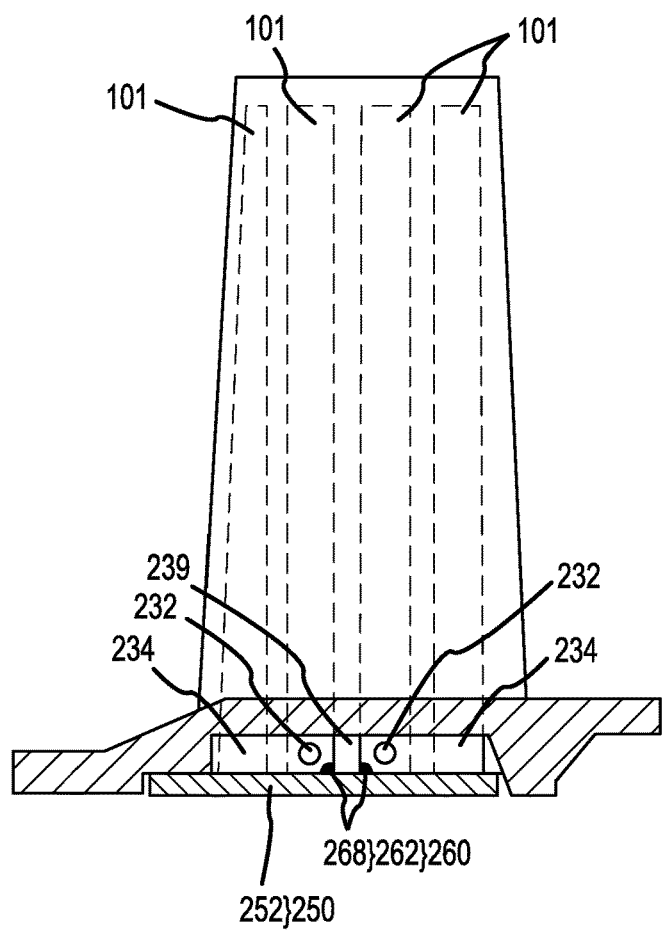
FIGS. 7A-B illustrate a side section view and end section view respectively of a rotor blade according to FIG. 2A, having a cover apparatus including a cover plate and a retention mechanism that includes rib welds, according to various embodiments.
Figure 7B:
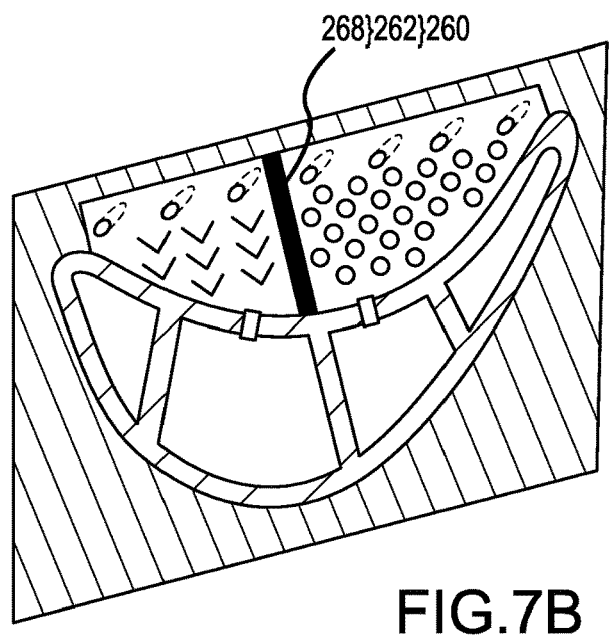

With renewed reference to FIGS. 2B, 3A, and 4, the platform cooling apparatus 230 may further comprise outflow apertures 244. The platform cooling apparatus 230 may comprise one or more outflow apertures 244. An outflow aperture 244 comprises an orifice extending in fluidic communication between a chamber of the platform cooling apparatus 230 and through at least a portion of the platform 200 and in fluidic communication with a surrounding ambient environment immediately proximate to a surface of the platform 200. In this manner, cooling air may flow into a cooling chamber 234 from an inflow channel 232, may transit through the cooling chamber 234, and may exit the cooling chamber 234 via one or more outflow apertures 244. For example, outflow apertures 244 may be disposed in each of first cooling chamber 234-1, second cooling chamber 234-2, third cooling chamber 234-3, fourth cooling chamber 234-4, fifth cooling chamber 234-5, sixth cooling chamber 234-6, seventh cooling chamber 234-7, and eighth cooling chamber 234-8.

With reference to FIGS. 2B, 4, 5A-B, 6A-B, and 7A-B, a cooling cover apparatus 250 may comprise a cover plate 252. A cover plate 252 may comprise a plate structure configured to at least partially enclose (e.g., at least partially fluidically seal) the platform cooling apparatus 230 (such as the one or more cooling chambers 234), whereby heat transfer may be improved, and in various embodiments, further whereby structural support of the platform 200 may be provided. The cover plate 252 may be disposed radially inward (relative to the engine central longitudinal axis X-X') of the platform cooling apparatus 230. In this manner, centrifugal loading such as during engine operation, may tend to promote retention of the cover plate 252 in proper position.

Figure 8A:
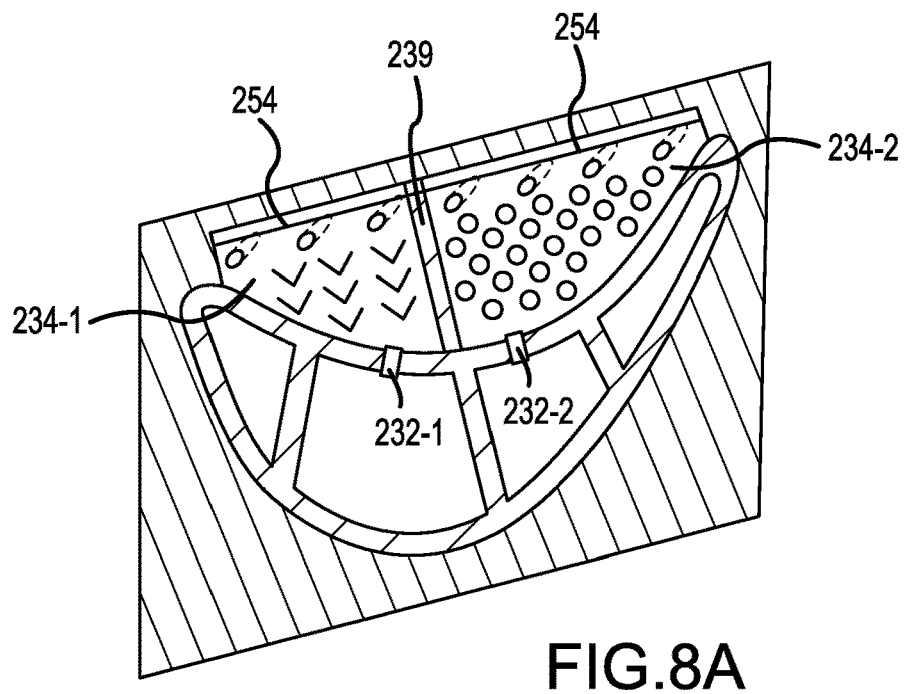
FIGS. 8A-B illustrate a side section view and end section view respectively of a rotor blade according to FIG. 2A, having a cover apparatus including a cover plate and a retention mechanism that includes integral formation of the cover plate, and further having a defined gap, according to various embodiments.
Figure 8B:
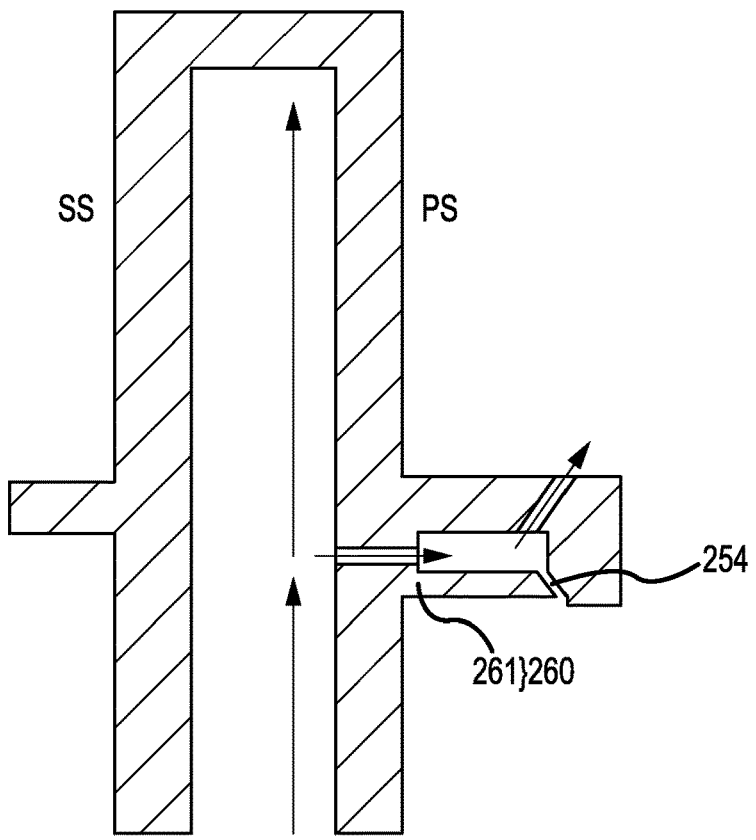

With reference to FIGS. 2B, 4, and 8A-B, a cooling cover apparatus 250 may further comprise a defined gap 254. A defined gap 254 may comprise an opening between the cooling cover apparatus 250 and the platform 200, whereby cooling air may escape from the cooling chamber 234. A defined gap 254 may comprise a gap configured to accommodate materials with different coefficients of thermal expansion, such as to ameliorate buckling of components, or may comprise a gap configured to accommodate a calibrated leak whereby cooling air may escape from the cooling chamber 234 in order to enhance heat transfer between the platform 200 and the cooling air. For example, a defined gap 254 may be associated with each cooling chamber 234, for example while FIGS. 8A-B depict two cooling chambers 234-1 and 234-2, FIG. 4 depicts eight cooling chambers, so that a defined gap 254 of FIG. 8A-B may be associated with any number of cooling chambers. Each defined gap 254 may comprise a different spacing, for instance, to calibrate the calibrated leak of cooling air according to the desired flow rate and in view of the pressure of the cooling air within the instant cooling chamber 234. In various embodiments, a defined gap 254 may comprise a spacing comprising between about 0.001 inches (about 0.0254 mm) and about 0.010 inches (about 0.254 mm). In various embodiments, a defined gap 254 may comprise a spacing comprising about 0.005 inches (about 0.127 mm) or less. Additionally the cooling cover may also comprise of one or more exit apertures of various shapes and sizes, such as cylindrical and/or non cylindrical geometries, in order to promote cooling chamber cavity fill characteristics and improve backside convective heat transfer and local thermal cooling effectiveness. With reference to FIGS. 2B, 5A-B, 6A-B, 7A-B, and 8A-B, the cooling cover apparatus 250 may further comprise a retention mechanism 260. A retention mechanism 260 may comprise any structure configured to at least partially retain the cooling cover apparatus 250 in mechanical communication with the platform 200 proximate to the cooling chamber 234. In various embodiments, the retention mechanism 260 may comprise an integral formation 261, such as the integral joining of the cooling cover apparatus 250 to the platform 200, as seen in FIG. 8B. In further embodiments, the retention mechanism 260 may comprise one or more welds 262 connecting the cover plate 252 to the platform 200, as seen in FIGS. 5A-7B.

With reference now to FIGS. 2B, 3A, and 8A, and with renewed focus on the cooling chambers 234-1 through 234-8, a cooling chamber 234 may comprise a channel extending at least partially through the platform 200 and configured to receive cooling air from one or more inflow channels 232 and convey it in thermodynamic communication with the platform 200. In various embodiments, each cooling chamber 234 is isolated from at least one adjacent cooling chamber 234 by a dividing rib 239. In this manner, the pressure drop from the end of the cooling chamber 234 such as an end closer to an inflow channel 232 to another end of the cooling chamber 234 such as an end farther from an inflow channel 232 may be managed, such as by introducing dividing ribs 239 whereby the volume of each cooling chamber 234 is managed. Consequently, the cooling behavior of the cooling chambers 234 within the platform cooling apparatus 230 may be improved relative to a platform cooling apparatus 230 with a single large cooling void instead of a plurality of cooling chambers 234. Moreover, in various embodiments, the cooling chambers 234 may comprise turns, such as to cause one or more cooling chamber 234 to adopt a spiral path, or concentric trapezoidal path, or any path as desired. The one or more dividing rib 239 is disposed between adjacent portions of a cooling chamber 234, and/or adjacent cooling chambers 234 to prevent merger of the channels. In various embodiments, each dividing rib 239 may comprise a planar structure extending from the pressure side 198 to the suction side 199 of the rotor blade 68 (FIG. 3A).

Moreover, each cooling chamber 234 may comprise structures configured to release the cooling air following its passage through the cooling chamber 234. For example, the platform cooling apparatus 230 may comprise outflow apertures 244 disposed throughout the cooling chamber 234. For instance, outflow apertures 244 may comprise film holes disposed through the platform 200 and connecting the interior space of the cooling chamber 234 in fluidic communication with a surrounding engine operating environment immediately proximate to a surface of the platform 200. In this manner, the cooling air may be released from the cooling chamber 234 following its passage through the cooling chamber 234.

With reference now to FIGS. 5A-B, 6A-B, and 7A-B, and with renewed focus on the retention mechanism 260 comprising welds 262, various configurations may be contemplated. For instance, a weld 262 may comprise a perimeter weld 264, a platform edge weld 266, and/or a rib weld 268. In various embodiments, a weld 262 comprises a perimeter weld 264. A perimeter weld 264 may comprise a weld extending around all edges of the cover plate 252. A perimeter weld 264 may be configured to prevent air leakage around the edges of the cover plate 252. The perimeter weld 624 may thus, in conjunction with the cover plate 252 enclose the platform cooling apparatus 230 to prevent air leakage, and may also enhance the strength of the platform 200 due to the extent of the weld all around the edges of the cover plate 252.

In various embodiments, a weld 262 may comprise a platform edge weld 266. A platform edge weld 266 may comprise a weld extending along a single edge of the cover plate 252. A platform edge weld 266 may thus, retain the cover plate 252 in position substantially enclosing the platform cooling apparatus 230, but may also permit air leakage around the edges that are not welded, for example, such as to form a defined gap 254, and/or to ameliorate stress from thermal growth mismatch between the cover plate 252 and the platform 200.

Furthermore, a weld 262 may comprise a rib weld 268. A rib weld 268 may comprise a weld extending along a dividing rib 239 of the platform cooling apparatus 230 and joining the dividing rib 239 to the cover plate 252. In various embodiments, one rib weld 268 may extend along a dividing rib 239. In further embodiments, such as wherein more than one dividing rib 239 exists, rib welds 268 may extend along each dividing rib 239. In this manner, the cover plate 252 may be retained in position substantially enclosing the platform cooling apparatus 230, but may also permit air leakage around the edges that are not welded, for example, such as to form a defined gap 254, and/or to ameliorate stress from thermal growth mismatch between the cover plate 252 and the platform 200.

With reference to FIGS. 1-8B, having discussed aspects of a platform 200, a platform 200 may be made of various materials. For instance, a platform 200 may be made of a single material, or different materials, or combinations of materials. For example, components of the system are made from metal. For example, aspects of a platform 200 are metal, such as nickel, cobalt, molybdenum, titanium, aluminum, steel, or stainless steel, though it alternatively comprises numerous other materials configured to provide support. Components of the system are optionally made from other materials such as, for example, composite, ceramic, plastics, polymers, alloys, glass, binder, epoxy, polyester, acrylic, or any material or combination of materials having desired material properties, such as heat tolerance, strength, stiffness, or weight. Portions of a platform 200 as disclosed herein are optionally made of different materials or combinations of materials, and/or comprise coatings. Moreover, components of the platform 200 are in some instances mixtures of different materials according to different ratios, gradients, and the like.

A platform 200 thus has multiple materials, or any material configuration suitable to enhance or reinforce the resiliency and/or support of the system when subjected to wear in an aircraft operating environment or to satisfy other desired electromagnetic, chemical, physical, or material properties, for example coefficient of thermal expansion, ductility, weight, flexibility, strength, or heat tolerance.

One such material is an austenitic nickel-chromium-based alloy such as Inconel®, which is available from Special Metals Corporation of New Hartford, N.Y., USA. Other such material includes ceramic matrix composite (CMC). Further material includes refractory metal, for example, an alloy of titanium, such as, titanium-zirconium-molybdenum (TZM).

Various benefits and advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A platform for an airfoil of a gas turbine engine, the gas turbine engine having an engine central longitudinal axis, wherein the platform comprises:
a platform cooling apparatus comprising a first cooling chamber and a second cooling chamber, wherein the first cooling chamber and the second cooling chamber are separated and fluidically isolated from each other within the platform by a first dividing rib, wherein the first cooling chamber and the second cooling chamber are disposed at least partially through the platform and are configured to conduct cooling air,
wherein the platform cooling apparatus further comprises a first outflow aperture comprising an orifice extending in fluidic communication between the first cooling chamber of the platform cooling apparatus and through at least a portion of the platform and in fluidic communication with a surrounding ambient environment immediately proximate to an external surface of the platform;
wherein the platform cooling apparatus further comprises a first inflow channel in fluidic communication with the first cooling chamber wherein the first inflow channel is configured to conduct the cooling air to the first cooling chamber;
wherein the platform cooling apparatus further comprises a second inflow channel in fluidic communication with the second cooling chamber, wherein the second inflow channel is configured to conduct the cooling air to the second cooling chamber;
a cooling cover apparatus at least partially fluidically sealing the platform cooling apparatus; and
a defined gap comprising an opening between the cooling cover apparatus and the platform whereby the cooling air may escape from the first cooling chamber;
wherein each of an axial span and a circumferential span of the first cooling chamber is greater than a dimension of the orifice of the first outflow aperture and wherein each of the axial span and the circumferential span of the first cooling chamber is also greater than a cross-sectional dimension of the first dividing rib.

2. The platform according to claim 1, further comprising heat transfer enhancement features disposed within the first cooling chamber.

3. The platform according to claim 1, wherein the first inflow channel is in fluidic communication with a first cooling cavity of an airfoil section.

4. The platform according to claim 1, wherein the platform cooling apparatus further comprises a second outflow aperture comprising a second orifice extending in fluidic communication between the second cooling chamber of the platform cooling apparatus and through at least a portion of the platform and in fluidic communication with the surrounding ambient environment immediately proximate to an external surface of the platform.

5. The platform according to claim 1, wherein the first inflow channel is in fluidic communication with a first cooling cavity of an airfoil section and the second inflow channel is in fluidic communication with a second cooling cavity of an airfoil section.

6. The platform according to claim 1, wherein the first inflow channel is in fluidic communication with a first cooling cavity of an airfoil section and the second inflow channel is in fluidic communication with the first cooling cavity of an airfoil section.

7. The platform according to claim 1, further comprising a retention mechanism to retain the cooling cover apparatus in mechanical communication with the platform proximate to the platform cooling apparatus.

8. The platform according to claim 7, wherein the retention mechanism comprises an integral formation comprising an integral joining of the cover plate to the platform.

9. The platform according to claim 7, wherein the cooling cover apparatus comprises a cover plate comprising a plate structure disposed radially inward of the platform cooling apparatus and configured to at least partially fluidically seal the platform cooling apparatus.

10. The platform according to claim 8, wherein the retention mechanism comprises a weld.

11. The platform according to claim 10, wherein the weld comprises a perimeter weld comprising welding extending around all edges of the cover plate.

12. The platform according to claim 10, wherein the weld comprises a platform edge weld comprising welding extending along a single edge of the cover plate.

13. The platform according to claim 10, wherein the weld comprises a rib weld extending along the first dividing rib of the platform cooling apparatus and joining the first dividing rib to the cover plate.

14. A rotor blade of a gas turbine engine having an engine central longitudinal axis, the rotor blade comprising:
a blade airfoil section comprising a cooling cavity; and
a platform comprising:
a platform cooling apparatus comprising a first cooling chamber and a second cooling chamber separated by a first dividing rib, wherein the first cooling chamber and the second cooling chamber are disposed at least partially through the platform, and configured to conduct cooling air,
wherein the platform cooling apparatus further comprises a first outflow aperture comprising an orifice extending in fluidic communication between the first cooling chamber of the platform cooling apparatus and through at least a portion of the platform and in fluidic communication with a surrounding ambient environment immediately proximate to a surface of a rotor blade;
wherein the platform cooling apparatus further comprises a first inflow channel in fluidic communication with the first cooling chamber, wherein the first inflow channel is configured to conduct the cooling air to the first cooling chamber, wherein the first inflow channel is in fluidic communication with the first cooling cavity of the airfoil section;
wherein the platform cooling apparatus further comprises a second inflow channel in fluidic communication with the second cooling chamber, wherein the second inflow channel is configured to conduct the cooling air to the second cooling chamber;
a cooling cover apparatus at least partially fluidically sealing the platform cooling apparatus; and
a defined gap comprising an opening between the cooling cover apparatus and the platform whereby the cooling air may escape from the first cooling chamber;
wherein each of an axial span and a circumferential span of the first cooling chamber is greater than a dimension of the orifice of the first outflow aperture, wherein each of the axial span and the circumferential span of the first cooling chamber is also greater than a cross-sectional dimension of the first dividing rib.

15. A rotor blade according to claim 14, wherein the first cooling chamber and the second cooling chamber are fluidically isolated from each other within the platform by the first dividing rib.

16. A method of forming a platform for an airfoil of a gas turbine engine, the gas turbine engine having an engine central longitudinal axis, wherein the method comprises:
forming a platform cooling apparatus comprising a first cooling chamber and a second cooling chamber separated by a first dividing rib, and disposed at least partially through the platform, and configured to conduct cooling air, wherein the first dividing rib fluidically isolates the first cooling chamber from the second cooling chamber within the platform,
wherein the platform cooling apparatus further comprises a first outflow aperture comprising an orifice extending in fluidic communication between the first cooling chamber of the platform cooling apparatus and through at least a portion of the platform and in fluidic communication with a surrounding ambient environment immediately proximate to an external surface of the platform;
wherein the platform cooling apparatus further comprises a first inflow channel in fluidic communication with the first cooling chamber wherein the first inflow channel is configured to conduct the cooling air to the first cooling chamber;
wherein the platform cooling apparatus further comprises a second inflow channel in fluidic communication with the second cooling chamber, wherein the second inflow channel is configured to conduct the cooling air to the second cooling chamber; and
forming a cooling cover apparatus at least partially fluidically sealing the platform cooling apparatus;
wherein forming the cooling cover apparatus comprises forming a defined gap comprising an opening between the cooling cover apparatus and the platform whereby the cooling air may escape from the first cooling chamber;
wherein each of an axial span and a circumferential span of the first cooling chamber is greater than a dimension of the orifice of the first outflow aperture, wherein each of the axial span and the circumferential span of the first cooling chamber is also greater than a cross-sectional dimension of the first dividing rib.

* * * * *